(12) United States Patent
Knutson-Ek

(10) Patent No.: US 7,679,653 B2
(45) Date of Patent: Mar. 16, 2010

(54) DIGITAL IMAGE ACQUISITION ARRANGED TO ACQUIRE IMAGE DATA RELATED TO DIFFERENT LIGHT CONFIGURATIONS

(75) Inventor: Björn Knutson-Ek, Hässelby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 307 days.

(21) Appl. No.: 11/844,073

(22) Filed: Aug. 23, 2007

(65) Prior Publication Data

US 2008/0316332 A1     Dec. 25, 2008

Related U.S. Application Data

(60) Provisional application No. 60/945,426, filed on Jun. 21, 2007.

(51) Int. Cl.
*H04N 9/73* (2006.01)
*H04N 5/222* (2006.01)

(52) U.S. Cl. .............. 348/224.1; 348/333.05; 348/371

(58) Field of Classification Search .............. 348/216.1, 348/217.1, 224.1, 333.05, 333.12, 362, 370–371; 396/222
See application file for complete search history.

(56) References Cited

U.S. PATENT DOCUMENTS

| | | | |
|---|---|---|---|
| 6,177,958 B1 * | 1/2001 | Anderson | 348/362 |
| 7,319,489 B2 * | 1/2008 | Miki | 348/371 |
| 7,408,574 B2 * | 8/2008 | Miyazaki | 348/231.1 |
| 7,430,002 B2 * | 9/2008 | Poplin | 348/229.1 |
| 2005/0231631 A1 * | 10/2005 | Miyazaki | 348/362 |
| 2006/0028579 A1 * | 2/2006 | Sato | 348/362 |
| 2006/0044444 A1 * | 3/2006 | Okamoto et al. | 348/333.05 |
| 2006/0067667 A1 * | 3/2006 | Kita | 396/180 |

FOREIGN PATENT DOCUMENTS

JP     2006039254 A  *  2/2006

* cited by examiner

*Primary Examiner*—Sinh Tran
*Assistant Examiner*—Daniel M Pasiewicz
(74) *Attorney, Agent, or Firm*—Harrity & Harrity, LLP (57) ABSTRACT

Image acquisition device, method and computer program for digital image acquisition, where the image acquisition device comprises an actuated user interface, where the image acquisition device receives control information from a user indicative of actuation of the user interface, initiates an image acquisition process by receiving lighting data on its sensor and detecting light information. A processor in the image acquisition device analyzes then the detected light information and converts these to image data and acquires image data related to at least two different light configurations, where at least one of the light configuration comprises an image acquired by means of a flash output in the image acquisition device.

18 Claims, 5 Drawing Sheets

DIGITAL IMAGE ACQUISITION ARRANGED TO ACQUIRE IMAGE DATA RELATED TO DIFFERENT LIGHT CONFIGURATIONS

RELATED APPLICATION

This application claims priority under 35 U.S.C. §119 based on U.S. Provisional Application No. 60/945,426, filed Jun. 21, 2007, the disclosure of which is hereby incorporated herein by reference.

TECHNICAL FIELD

Embodiments disclosed herein may relate to the field of digital photography.

BACKGROUND

When using a camera for making photographs in low light conditions, be it an analog or a digital camera, one is confronted with a common problem of whether to use a usually built-in flashlight or to photograph without the flashlight (e.g., with or without the "flash").

Usually, the user of the camera chooses to take two shots, one with and one without the flashlight, or vice versa. However, this method has the disadvantage of taking two different shots, since the camera will have to be moved when turning on the flashlight and taking the next picture. Additionally, the object to be photographed may have moved after the first picture was taken. This may be a problem with living objects, such as animals or human beings.

Also, while in older analog cameras, the end result is not seen until the film is developed. In some analog cameras of the active-pixel sensor type (APS-type) a preview of the picture may be seen before the film is developed. In a digital camera, a preview of the end result may be seen in the camera display, but usually this is not possible for a photograph which is intended to be taken with a flashlight.

By the same token, sometimes the photographer is interested in retaining the atmosphere seen in the scenery on the photograph and objects in the background, while sometimes he or she may be interested in details in the foreground.

Some solutions exist to the too dark/too bright photograph problem, such as when a picture is taken without and with flashlight.

These solutions are mostly based on using the exposure compensation function, by taking two or more pictures where some of the photographs are underexposed and some overexposed. The user may then select the pictures he or she thinks is the best one or let the camera processor calculate a mean exposure picture representing the best picture.

The same procedure may be performed with the white balance function on a digital camera. A common term for the taking of multiple photographs using by changing one parameter is bracketing.

SUMMARY

One ore more embodiments may be related to a digital image acquisition device manually controllable by a user, including an actuated user interface unit for initiating an image acquisition process; an optical sensing unit for detecting light information; and a processing unit for analyzing detected light information and converting these to image data wherein the processing unit is, when the interface unit is actuated, arranged to acquire image data related to at least two different light configurations.

Another aspect of one or more embodiments may be related to a method for digital image acquisition comprising a manually controllable image acquisition unit including an actuated user interface unit, the method comprising: a) receiving control information from a user indicative of actuation of the interface unit; b) initiating an image acquisition process; c) detecting light information; d) analyzing detected light information and converting these to image data; e) acquiring image data related to at least two different light configurations. Yet another aspect of one or more embodiments may be related to a computer program for digital image acquisition adapted to be executed in a manually controllable image acquisition unit including an actuated user interface unit, the method computer program comprising instruction sets for: a) receiving control information from a user indicative of actuation of the interface unit; b) initiating an image acquisition process; c) detecting light information; d) analyzing detected light information and converting these to image data; e) acquiring image data related to at least two different light configurations.

These and other advantages of some embodiments disclosed herein will be more clearly understood by means of the following detailed description and the accompanying drawings.

DETAILED DESCRIPTION OF THE PREFERRED EMBODIMENTS

Embodiments disclosed herein may reduce some of the problems related to known technology.

Figure 1:
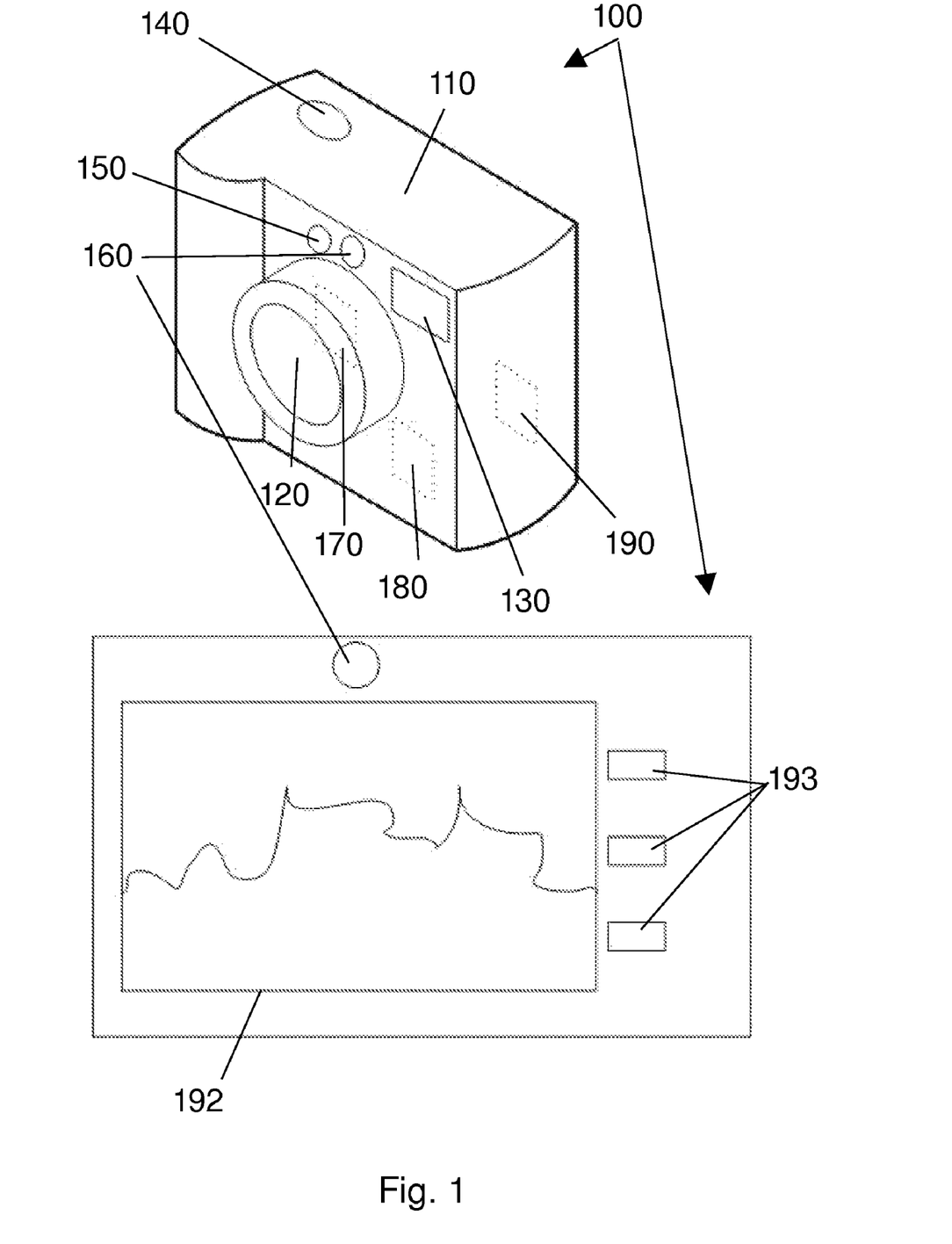
FIG. 1 illustrates an exemplary digital camera in which embodiments disclosed herein may be implemented.

FIG. 1 illustrates the front and back of an exemplary digital camera 100 in which embodiments disclosed herein may be implemented.

The digital camera 100 may include a body 110, a lens 120 connected to the body 110, a flash output unit 130 which in this illustration is integrated in the camera body 110, a shutter release button 140 on top of the body 110, an assist light 150 and an optical viewfinder 160. Moreover, the camera 100 may include a digital sensing unit 170, a processing unit 180 and a memory 190.

Figure 2:
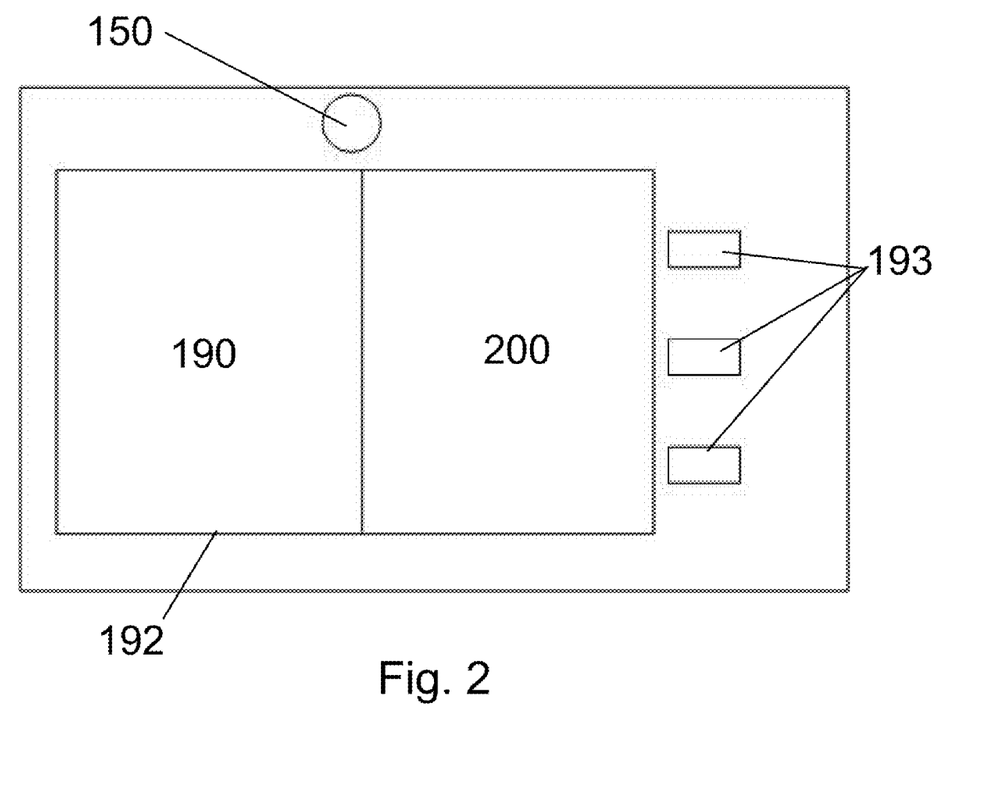
FIG. 2 illustrates a backside view of the exemplary digital camera according to a first embodiment disclosed herein, with two pictures taken.

The camera body 100 may be made of any material suitable for a camera and may also have other shapes than the example shape in FIG. 2. The camera body will not be elaborated further here.

As far as the lens attached to the camera body 100 is concerned, it may have any kind of structure, e.g., a fish-eye, wide-angle, macro, tele or, any other suitable lens. The function of the flash output unit 130 is to illuminate the motive to be photographed. Especially in low lighting conditions the flash output unit 130 may become active. Also, the output power for the light coming from the flash output unit 130 may be regulated manually or automatically by the digital camera In the embodiment of FIG. 1, the flash output unit 130 may be located on the front of the camera body 100, but the camera according to one embodiment may include the flash output unit on any other suitable part of the camera body 100 or be an external flash output unit (not shown) attachable to the camera body 100.

The shutter release button may be situated on the upper part of the camera body 100. The shutter release button 140 may be located on any part of the camera body and not necessarily only on the top of it as shown in FIG. 1.

One other element on the front part of the camera body may be the assist light 150 aiding the camera 100 to focus on an object. Sometimes the lighting conditions can be difficult, especially when in low light which may present difficulties for an autofocus function in the camera. Using the assist light 150, a beam of light may be projected onto a part of the object to be photographed making it easier to obtain a sharp picture of the object even under difficult lighting conditions.

Also, the camera body 100 may include an optical view finder 160 for allowing a user of the camera to see the whole or part of a motive as seen through the lens 120. Sometimes, the view through the optical viewfinder may comprise a square or rectangular bracketed area indicating the area of the motive to be captured by the camera. The optical viewfinder 160 in the camera body 100 may or may not comprise this area, as needed.

Furthermore, the camera 100 may include a sensing unit 170 located in this example behind the camera lens 120, where the sensing unit 170 may comprise a photo detector. The function of the photo detector may be to register intensity variations in light reflected from a motive and passing through the camera lens 120. The sensing unit may include any light sensitive unit able to convert intensity variations in light reflected from an object to current values.

Connected (not shown) to the sensing unit in the inner part of the camera housing 110 may be a processing unit 180 whose task, among others, may include evaluating the current values received from the sensing unit 170 and with the help of filters and image processing algorithms convert these values to a color picture. The way this operation is performed may vary, but is essentially known to the skilled person and will not be explained in detail. Also, the processing unit may, in one embodiment, only perform conversion of the intensity values to a color picture without any further image processing, e.g., converting the intensity information to a so called RAW-picture format. The processing unit may, for example, be an ASIC (Application Specific Integrated Circuit) or some other processing unit able to evaluate intensity information from a sensing unit and to perform image processing algorithms on this information.

After the intensity information is converted to a color picture, which may or may not be processed further, the picture may be saved in a memory 190, which may be an internal memory of the camera, e.g., a RAM (Random Access Memory), a Flash ROM (Flash Read Only Memory) or some other type of internal memory or an external memory, such as usually available in the form of memory cards or hard disks of appropriate size.

In the lower part of FIG. 1 the back side of the exemplary camera housing 110 is shown. The back side may include the already described optical viewfinder 160, a digital viewfinder 192, and user interface of the camera 193 that may include one or more buttons for selecting different functions in the camera 100.

The digital viewfinder 192 may works in a similar way to known digital viewfinders in digital cameras. As digital viewfinders are generally known to the skilled person their function will not be explained further here. The digital viewfinder of a digital camera according to one embodiment may, aside from known functions, present a series of two or more pictures as illustrated in FIG. 2. This will be explained more in detail later.

The user interface 193 on the back side of the camera may be arranged to provide the user with the possibility of altering a number of parameters, such as selecting a dual capture mode. According to one embodiment, the dual capture mode may be a shooting mode where two pictures are taken in direct sequence, one without the use of the flashlight and the other with the flashlight turned on. However, the order of taking photographs without and with flashlight may be selectable.

The dual capture setting on the user interface 193 may also be selected so as to take more than two pictures in rapid sequence, such as taking one without the use of flashlight 130 and the remaining pictures with varying degrees of output power from the flashlight 130.

Apart from the dual capture function according to one embodiment, the user may via the user interface 193 select other shooting modes and parameters, such as white-balance, color space, colors in general, ISO-sensitivity, exposure and other parameters relevant for shooting a picture. As far as shooting modes are concerned the user may choose between a variety of programs, such as shutter-priority and aperture-priority programs, manual programs and other predefined programs, such as macro, landscape or portrait programs.

Now, according to one or more embodiments, when the user with the help of the user interface 193 selects the dual capture setting on the camera 100, the camera may take two or more pictures of the same motive, when the user presses the shutter release button 140, where at least one of them may be taken with the flash output unit 130 turned off and the rest with the flash output unit 130 turned on. Pictures may be saved in the memory 190 of the camera 100 for later review. In this fashion, the user of the camera may be able to make two or more pictures without and with flashlight of an essentially identical scenery.

Then, the user may later decide which pictures he is most satisfied with when connecting the camera 100 to his computer (not shown).

However, by using the user interface 193, the user may also, when selecting the dual capture mode, select the automatic activation of dual capture. This may be useful when the processing unit 180 of the camera 100 via the sensor unit 170 detects an intensity distribution indicative of difficult lighting conditions. Normally, the processing unit detects these conditions by comparing them with well-known intensity distributions stored in the memory 190 of the camera 100. This may have the advantage of the user not being forced to pay attention to difficult lighting conditions himself and therefore would simplify the taking of two or more photographs without and with flashlight even further.

Turning now to FIG. 2, the back side of the digital camera from FIG. 1 according to another embodiment is shown.

Here, a digital viewfinder 192 may be arranged to display two consecutive photographs. The left photograph 190 (not illustrated) is taken with the flash output unit 130 turned off, while the right photograph (not illustrated) 200 is taken with the flash output unit 130 turned on. The two pictures may be taken by pressing the shutter release button 140 halfway. In this fashion, the user may quickly see how the final picture without flashlight and with flashlight will look like. At that stage he may easily decide which picture to take or which picture is more desirable when a picture is to be taken during low light conditions, such as in the shade or indoors.

Also, the processing unit 180 of the camera 100 may via an exposure metering function decide, when performing metering on an object to be photographed, that the lighting conditions are difficult, e.g., either too little or too much incident light falling on the sensing unit 170, and automatically start taking at least two pictures, one without flashlight and one with the flash output unit 130 turned on. This function may also be manually selected by the user of the camera 100.

However, there may be more than two pictures taken, such as, for example taking three or more pictures, where one of the pictures is taken without the use of the flash output unit 130, and the rest with varying degrees of output power for the light from the flash output unit 130. This series of pictures may be displayed in the digital viewfinder 192 of the camera 100.

In order to provide the user with the possibility to judge the final result of the photographing before taking the actual picture, the camera 100 may provide the function to quickly take two or more pictures in sequence when the user presses the shutter release button halfway 130, where one picture is taken without the use of the flash output unit 130 and the rest with varying degrees of the output power for the flash output unit 130. This operation may or may not involve focusing on the object to be photographed.

Figure 3:
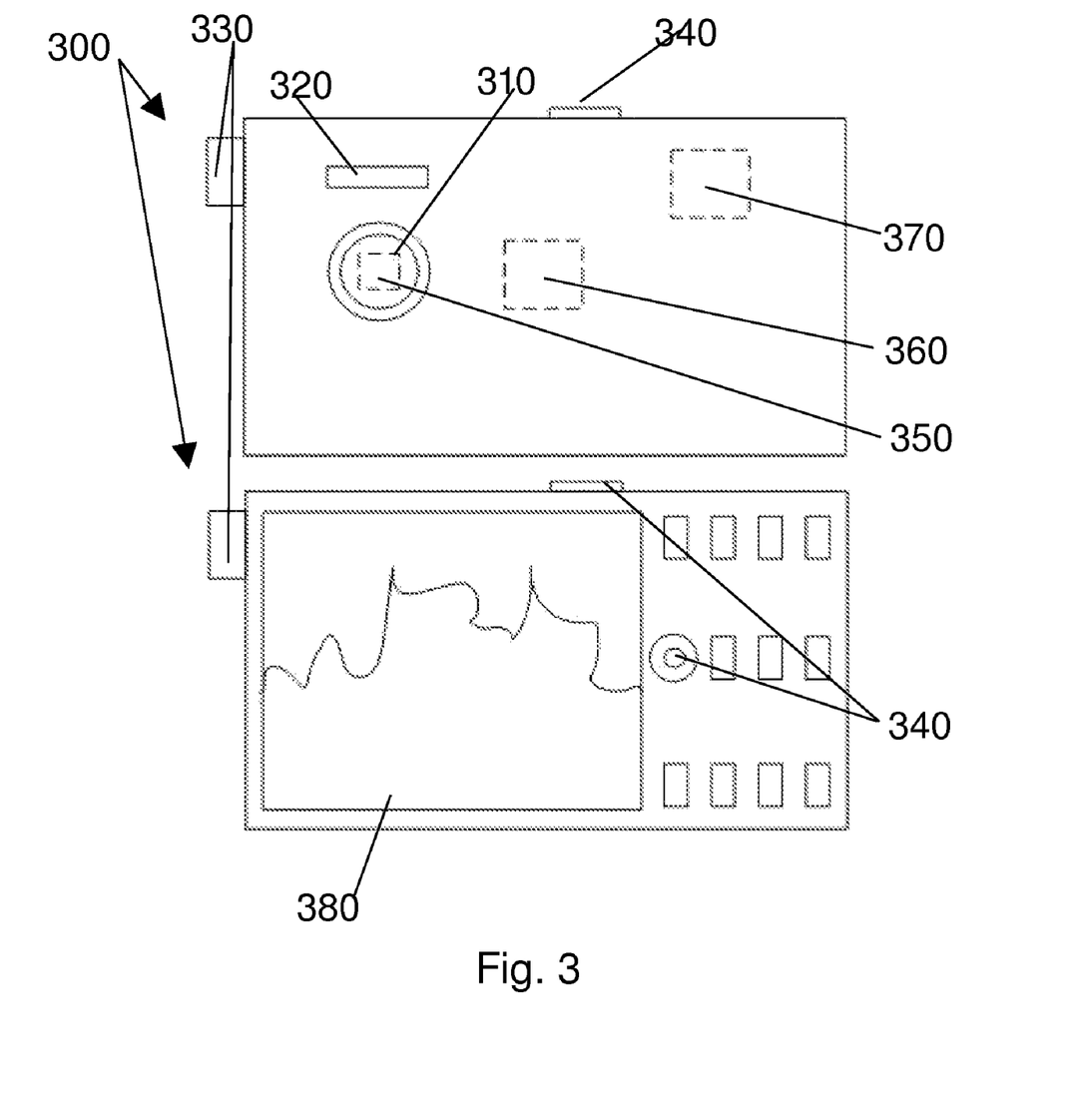
FIG. 3 illustrates an exemplary mobile terminal including a camera according to one or more embodiments disclosed herein.

FIG. 3 illustrates a mobile terminal 300 that may include a camera according to one other embodiment.

In the upper part of FIG. 3, the exemplary mobile terminal 300 is shown from the backside. The mobile terminal 300 may include a lens 310, a flash output unit 320, a transceiver 330 and a shutter release button 340. Moreover, the mobile terminal 300 may include a sensing unit 350, a processing unit 360 and a memory 370 depicted by dashed lines.

Seen from the front in the lower part of the FIG. 3, the exemplary mobile terminal 300 also may include a display 380.

The lens 310 in the mobile terminal may be equipped with an optical zoom function or not, as preferred. Also, it may comprise glass or a lens made of plastic and basically any type of lens suitable to be used in a mobile terminal.

The flash output unit 320 may comprise any type of flash lamp, such as a led-diode flashlight or a light bulb, such as used in conventional compact and SLR-cameras.

It should be borne in mind that the choice of the flashlight technology may have an effect on the final result when the picture is taken using the flashlight.

As far as the transceiver 330 of the mobile terminal is concerned its function will not be described in detail here, since it is known to the person skilled in the art.

Using the transceiver, the mobile terminal 300 may for example send and receive photographs taken with its camera or receive photographs taken by other cameras or mobile terminals.

The function of the shutter release button 340, which in FIG. 3 may be located on the side of the mobile terminal and its front, may be similar to what is described earlier for FIG. 1.

Thus, if the user has chosen the dual capture mode for the camera in the mobile terminal 300, after pressing the shutter release button 340 the camera will take two or more consecutive pictures of the same motive, where at least one of those pictures may be taken by using the flash output unit 320 and the others without using the flash output unit 320. The pictures may be immediately stored onto the memory 370 of the mobile terminal 300.

As already mentioned for the embodiment of the camera in FIG. 1, the camera in the mobile terminal 300 may also take more than two consecutive pictures of the same motive but with varying output power from the flash output unit 320 and at least one picture with the flash output unit 320 switched off.

Here, the shutter release button 340 on the front part of the mobile terminal 340 may also perform other functions besides focusing the lens on the object to be photographed and taking pictures, such as flipping through a series of already taken pictures shown on the display 340 of the mobile terminal, or zooming in or out of these already taken pictures. Aside from these functions, the shutter release button 340 on the front and on the side of the mobile terminal may perform any other function suitable to be performed in a mobile terminal.

The function of the sensing unit 350 may be similar to the function of the sensing unit 370 in the camera 100 of FIG. 1. It may comprise a sensing unit 350 detecting intensity variation in light entering through the lens 310 of the mobile terminal 300. The sensing unit 350 may slightly differ in size compared to the sensing unit 170 in FIG. 1 in order to fulfill the space constraints usually dealt with when constructing mobile terminals, such as cell phones or PDAs.

A processing unit 360 may, aside from performing exposure metering and image processing functions similar to the operation performed by the processing unit 180 in FIG. 1, perform other types of functions more characteristic of a mobile terminal which are known to the skilled person and will not be explained further.

The processing unit 360 may, as in the case of the camera 100 in FIG. 1, perform exposure metering on a motive and from the light intensity information registered by the sensing unit 350 judge whether it should take one or more pictures with and without flashlight. This may occur when a user of the mobile terminal 300 has pressed the shutter release button 340 halfway.

Finally, the display 380 of the mobile terminal 300 may also serve as a digital viewfinder for the camera in the mobile terminal 300. Using the digital viewfinder a user of the mobile terminal 300 may choose a composition of a picture to be taken and see a possible lighting environment of the picture before it is taken. Also, the processing unit 360 may display the processed pictures on the digital viewfinder after they are finally processed.

Figure 4:
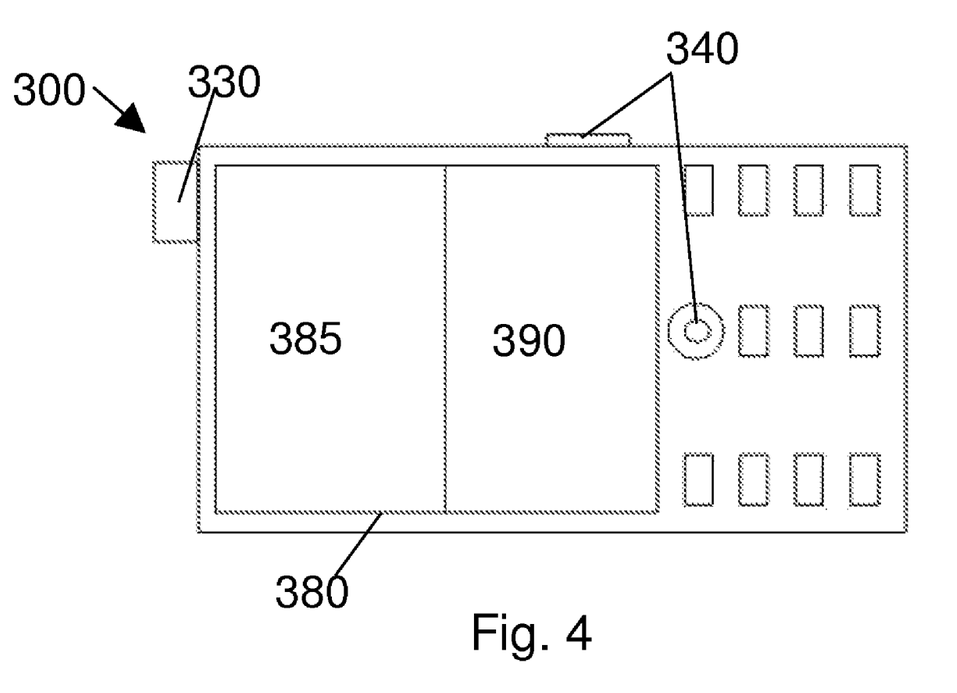
FIG. 4 illustrates a view of the viewfinder of the exemplary mobile terminal camera according to one or more embodiments disclosed herein, with two pictures taken.

Turning now to FIG. 4, the mobile terminal according to another embodiment is shown, where two pictures in series are taken.

On the display or the digital viewfinder 380 of the mobile terminal 300, two pictures are shown, the left one 385 taken without the use of flashlight 320 and the right one 390 by having the flashlight active. The display 380 may also show more than two pictures, if for example, a series of more than two pictures are taken, where one of the pictures may be taken without flashlight while the others are taken with varying output power for the flashlight 320. Thus the user may easily compare the results of preserving the atmosphere of the motive when no flashlight was used to various degrees of lighting objects in the foreground and choose the picture he is the most satisfied with.

This series of pictures may also be taken rapidly when the user is pressing the shutter release button 340 halfway with no or only fast focusing on the object to be photographed, thus showing a preview of the final result before the actual picture is taken.

As already mentioned earlier, the user may choose a "bracketing" function on the camera by selecting one or more parameters to be bracketed. This may include exposure, ISO-sensitivity, aperture and shutter together with varying output powers for the flashlight 320.

The user may also choose to let the camera of the mobile terminal 300 first take a picture without flashlight and then one or more pictures with flashlight in order not to disturb the object (especially humans and animals) before the flashlight is used.

Figure 5:
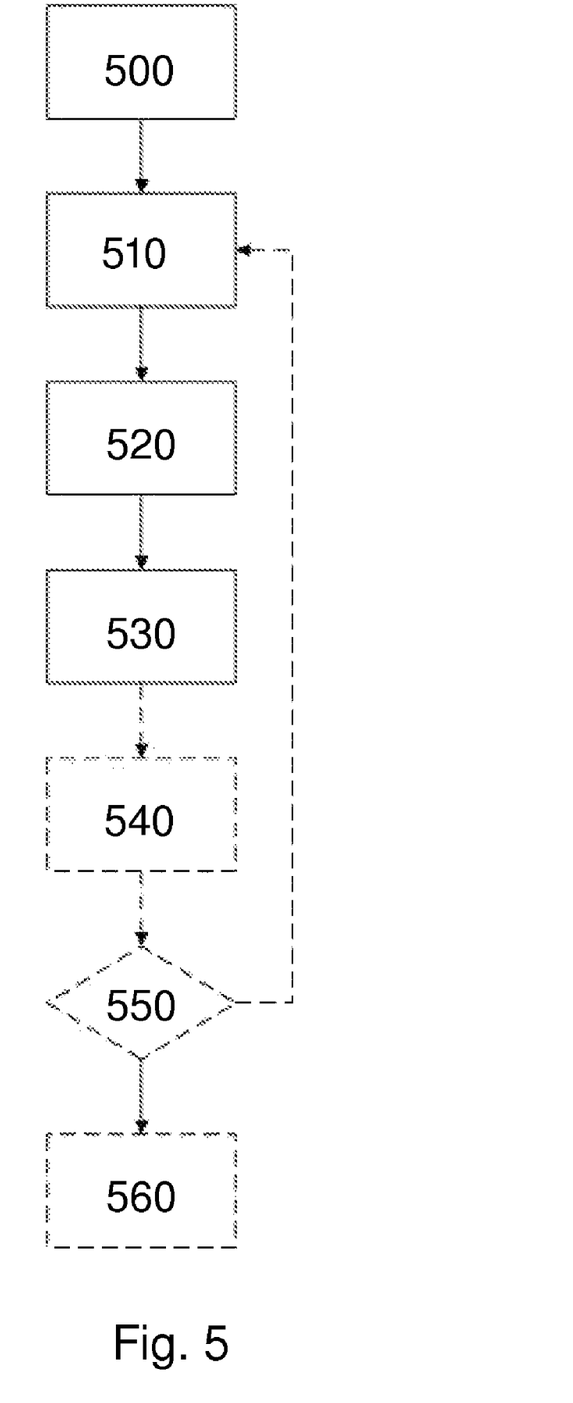
FIG. 5 illustrates an exemplary process according one embodiment of a method.

Turning now to FIG. 5, one embodiment of a method is described.

At block 500 a processing unit of a camera receives measurement values in the form of light intensity information from a sensing unit on the lighting conditions for the motive seen through the viewfinder. This light intensity information may be received automatically or after the user presses the shutter release button halfway, for example.

Thereafter, at block 510 the processing unit using the received measurement values calculates exposure data for the motive by comparing the received measurement values to predefined measurement values stored in the camera memory. These predefined measurement values may comprise intensity data for some well-known lighting conditions, such as indoor motive, outdoor motive, incandescent lighting, light bulb lighting and many other situations. The exposure data may comprise lens aperture, exposure time, ISO-values, white balance and some other exposure data which may be relevant for the motive to be photographed.

Also, the processing unit may from the received measurement values calculate an intensity distribution and compare it to well-defined intensity distributions store in the camera memory, thus being able to select the correct exposure data for the motive.

In the next block, at 520, the camera, using the calculated exposure data, may take a first picture of the motive seen through the optical or digital viewfinder of the camera. This picture may be taken without the use of the flashlight and will be converted by the processing unit into an image file which may be stored in the camera memory after some image processing may be performed on it.

Thereafter, at block 530, the processing unit may recalculate exposure data for the motive to be photographed by taking into account the use of the flashlight and thereafter use the recalculated exposure data to take a second picture of the motive by turning on the flashlight. After converting the intensity data into an image file the processing unit may store the image file in the camera memory for later examination on a computer or TV-screen.

However, in an alternative embodiment of the method according to one or more embodiments, the images taken with and without the flashlight are saved to the memory of the digital camera at a later stage.

In this alternative embodiment displayed in FIG. 5 by dashed lines, the processing unit of the camera displays at block 540 both pictures (with and without the flashlight turned on) on the digital viewfinder of the camera.

It should be mentioned here, that the processing unit may additionally, already after detecting difficult lighting conditions in the motive to be photographed, automatically decide to take two or more pictures of the motive, where at least one of the pictures may be taken by turning on the flash output unit. This may occur after pressing the shutter release button on the camera halfway. In this fashion the early detection of difficult lighting conditions may aid the user in rapidly opting for the "right" picture.

Difficult lighting conditions for the camera may comprise too many high and/or too many low measurement values or extreme differences between the highest and the lowest measurement values.

When speaking about high and low measurement values in the form of intensity values received from the sensing unit of the camera, a high value may correspond to an intensity value near a maximum intensity value the sensing unit can register. Conversely, a low intensity value may correspond to a value near the lowest intensity value the sensing unit is able to register.

Examples of difficult lighting conditions may be low light, such as in an indoor motive, candlelight and many dark areas in the motive, direct sunlight behind the object to be photographed making the object appear dark, light reflections from shiny surfaces, such as water, glass or metal or too high a contrast between the darkest and the lightest areas in the motive.

At block 550, the camera may wait for the user to select one of the pictures displayed by for example using the user interface of the camera and pressing the shutter release button completely.

If the user is not satisfied with either of the pictures taken, the processing unit in the camera may return to the exposure metering block 510.

Otherwise, if the user has chosen one or all of the pictures shown in the digital viewfinder of the camera, the processing may take all of the pictures in sequence, processes them and stores them in the camera memory, block 560.

It should be emphasized that the term "comprises/comprising" when used in the this specification is taken to specify the presence of stated features, integers, steps or components but does not preclude the presence or addition of one or more other features, integers, steps, components or groups thereof.

It will be appreciated by the skilled person that various modification of the present invention are possible and that the above presentation should be taken as limiting for the present invention. Ultimately, the scope of the present invention is only limited by the accompanying patent claims.

The invention claimed is:

1. A digital image acquisition device, comprising:
a user interface comprising a shutter release;
an optical sensor to detect light information associated with a motive; and
a processor to:
in response to the shutter release being partially depressed,
convert the detected light information to image data related to at least two different light configurations associated with the motive,
dynamically form at least two different images of the motive, where each of the at least two images is associated with a corresponding one of that at least two different light configurations, and cause the at least two images to be displayed simultaneously, and
in response to the shutter release being fully depressed,
provide, via the user interface, a selection of the at least two images, and
acquire, based on a selected one of the at least images, a final image of the motive.

2. The digital image acquisition device according to claim 1,
where the digital image acquisition device further comprises a light output to selectively illuminate the motive,
where at least one of the at least two light configurations is associated with the motive being illuminated by the light output, and where at least one other of the at least two light configurations is associated with the motive not being illuminated by the light output.

3. The digital image acquisition device according to claim 1, where the digital image acquisition device further comprises a memory to store the acquired image data.

4. The digital image acquisition device according to claim 1, where the user interface further comprises a digital display controlled by the processor.

5. The digital image acquisition device according to claim 1, where the processor is further to determine a level of digital image acquisition difficulty based on the detected light information.

6. The digital image acquisition device according to claim 5, where the processor is further to automatically process the light information and cause the at least two images of the motive to be displayed simultaneously, without a user input received via the user interface, when the determined level of the digital image acquisition difficulty exceeds a certain level.

7. The digital image acquisition device according to claim 2, where the processor, when processing the light information to dynamically form the at least two different light configurations, is further to analyze:
   a first intermediate image associated with the motive being illuminated by the light output, and
   a second intermediate image associated with the motive not being illuminated by the light output.

8. The digital image acquisition device according to claim 1, where the at least two different light configurations further comprise at least one of:
   different exposure settings,
   different time aperture settings, or
   different white balance settings.

9. The digital image acquisition device according to claim 1, where the digital image acquisition device comprises a digital camera.

10. A method for digital image acquisition via an image acquisition device including a user interface, the method comprising:
   receiving control information indicative of an actuation of the user interface, where the user interface comprises a shutter release, where the user interface comprises a first user interface level and a second user interface level, where the user interface, when the shutter release is partially actuated, is in the first user interface level, and where the user interface, when the shutter release is fully actuated, is in the second user interface level;
   detecting light information;
   analyzing the detected light information and converting the detected light information to image data related to at least two different light configurations;
   in response to detecting the first user interface level, simultaneously displaying images related to each of the at least two different light configurations;
   in response to detecting the second user interface level, providing a selection of the at least two light configurations, and
   acquiring, based on the selection, a final image.

11. The method according to claim 10, further comprising determining, from the detected light information, a level of difficulty of the light conditions.

12. The method according to claim 11, further comprising automatically simultaneously displaying, without detecting the first user interface level, the images related to each of the at least two different light configurations, when the determined level of difficulty of the light conditions exceeds a certain level.

13. The method of claim 10, where one of the at least two light configurations includes only ambient light and another of the at least two light configurations includes ambient light and light from a light source.

14. The method according to claim 10, where acquiring image data includes taking a plurality of images comprising at least one of different exposure settings, different time aperture settings, or different white balance settings.

15. The method according to claim 13, where acquiring image data includes taking one image with light from the light source and one image without light from the light source.

16. A non-transitory computer-readable medium including instructions for digital image acquisition in a manually controllable image acquisition device including an actuated user interface, the instructions executed by at least one processor, the computer-readable medium comprising:
   one or more instructions to receive control information indicative of an actuation of the user interface, where the actuated user interface comprises a shutter release, where the user interface comprises a first user interface level and a second user interface level, where the user interface, when the shutter release is partially actuated, is in the first user interface level, and where the user interface, when the shutter release is fully, actuated is in the second user interface level;
   one or more instructions to detect light information;
   one or more instructions to analyze the detected light information to form a single captured image,
   one or more instructions to convert the single captured image to multiple formed images related to at least two different light configurations, where one of the at least two light configurations includes ambient light associated with the detected light information and another of the at least two light configurations includes the ambient light and light from a light source, where the single captured image is converted to the multiple formed images without activation of the light source;
   one or more instructions to, in response to detecting the first user interface level, simultaneously display the formed images;
   one or more instructions to, in response to detecting the second user interface level, provide a selection of the at least two light configurations; and
   one or more instructions to acquire, based on the selection, a final image.

17. The computer-readable medium according to claim 16, further comprising:
   one or more instructions to determine, from the detected light information, a level of difficulty of the light conditions; and
   one or more instructions to simultaneously display, when the determined level of difficulty of the light conditions exceeds a certain level and without detecting the first user interface level, the images related to each of the at least two different light configurations.

18. The computer-readable medium according to claim 16, where the one or more instructions to acquire image data is further to take a plurality of images comprising at least one of different exposure settings, different time aperture settings, or different white balance settings.

* * * * *